(12) United States Patent
Malfait

(10) Patent No.: US 8,342,689 B2
(45) Date of Patent: Jan. 1, 2013

(54) SPLIT SCROLLING ILLUMINATION FOR LIGHT MODULATOR PANELS

(75) Inventor: Koen Malfait, Oekene (BE)

(73) Assignee: Barco N.V., Kortrijk (BE)

( * ) Notice: Subject to any disclaimer, the term of this patent is extended or adjusted under 35 U.S.C. 154(b) by 526 days.

(21) Appl. No.: 12/245,945

(22) Filed: Oct. 6, 2008

(65) Prior Publication Data

US 2009/0096995 A1 Apr. 16, 2009

(30) Foreign Application Priority Data

Oct. 4, 2007 (EP) .................................. 07075861

(51) Int. Cl.
*G03B 21/00* (2006.01)
*G03B 21/26* (2006.01)
*G02F 1/1335* (2006.01)

(52) U.S. Cl. ................................. 353/34; 353/30; 349/8
(58) Field of Classification Search .............. 353/30–31, 353/34, 48–49, 73, 82, 97, 122; 349/5, 7–9
See application file for complete search history.

(56) References Cited

U.S. PATENT DOCUMENTS

| 5,548,347 | A  | * | 8/1996 | Melnik et al. ................. 348/761 |
| 6,493,149 | B2 | * | 12/2002 | Ouchi ............................ 359/634 |
| 7,033,027 | B2 | * | 4/2006 | Maximus ........................ 353/31 |
| 7,064,795 | B2 | * | 6/2006 | Dean ............................... 348/679 |
| 2003/0030913 | A1 | * | 2/2003 | Park et al. ...................... 359/634 |
| 2004/0070829 | A1 |   | 4/2004 | Kurtz et al. |

FOREIGN PATENT DOCUMENTS

| EP | 1 274 256 A1 | 1/2003 |
| EP | 1455538 A2 * | 9/2004 |
| EP | 1 575 306 A1 | 9/2005 |
| WO | WO 03/055231 A1 | 7/2003 |

OTHER PUBLICATIONS

Someya. Jun, "Moving-Picture Response Time and Perceived Motion Blur on LCD Panels". *Information Display*, Oct. 2005. pp. 12-16.

* cited by examiner

*Primary Examiner* — Tony Ko
*Assistant Examiner* — Jori S Reilly-Diakun
(74) *Attorney, Agent, or Firm* — Bacon & Thomas, PLLC

(57) ABSTRACT

A display system comprises illumination means for providing a light beam; at least one color channel, each color channel being adapted for providing at least part of the light beam to a spatial light modulator panel comprising at least a first and a second zone; the spatial light modulator panel being for selectively modulating an impinging beam of light to form an image light beam. The display system further comprises splitting means for splitting the at least part of the light beam so that a split light beam is provided on the spatial light modulator panel, the split light beam comprising at least a first and a second sub-beam, and driving means for driving the first and second sub-beams such that the first sub-beam scrolls over the first zone and the second sub-beam scrolls over the second zone. A corresponding method to the display system is provided.

17 Claims, 10 Drawing Sheets

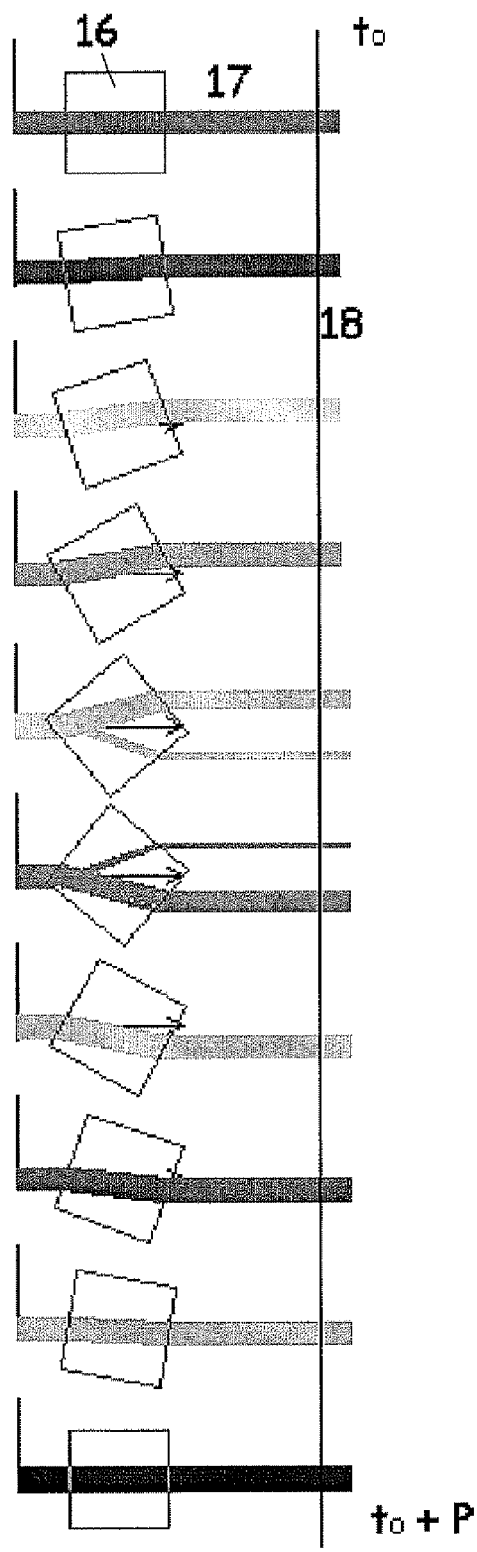
Fig. 2 – prior art

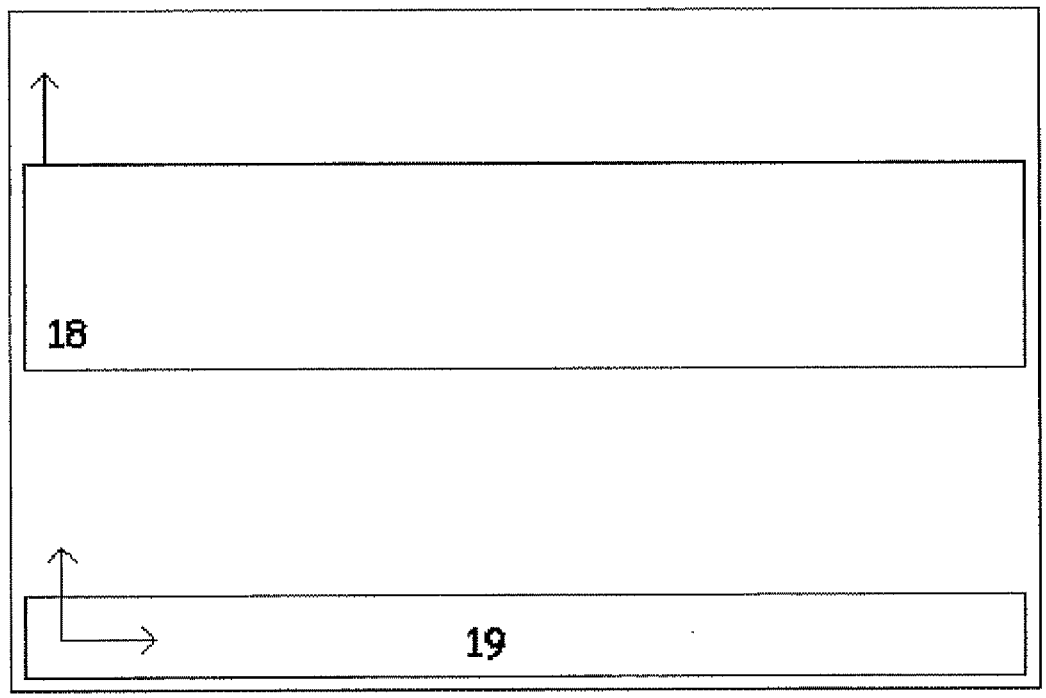
Fig. 3 – prior art
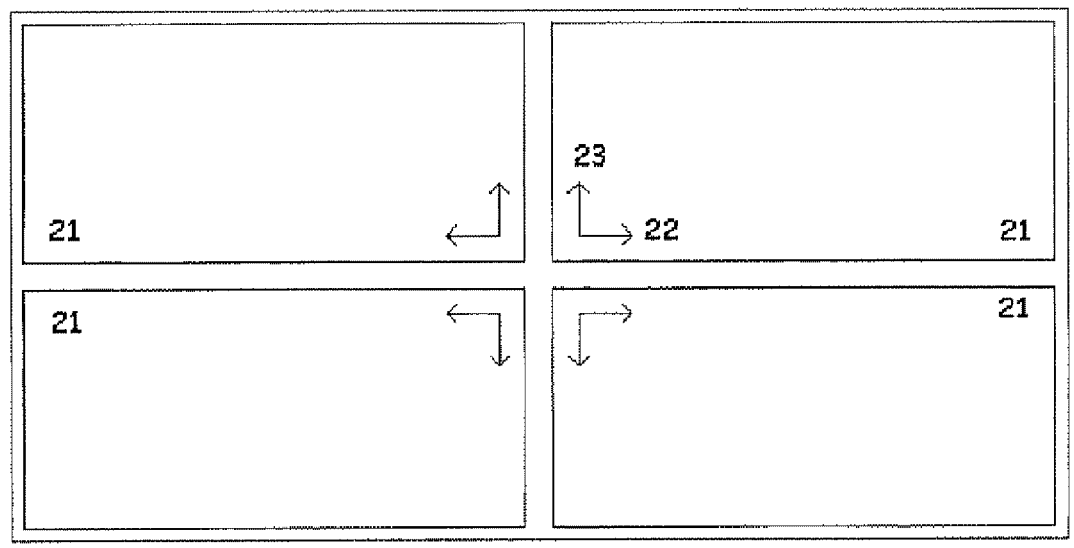
Fig. 4

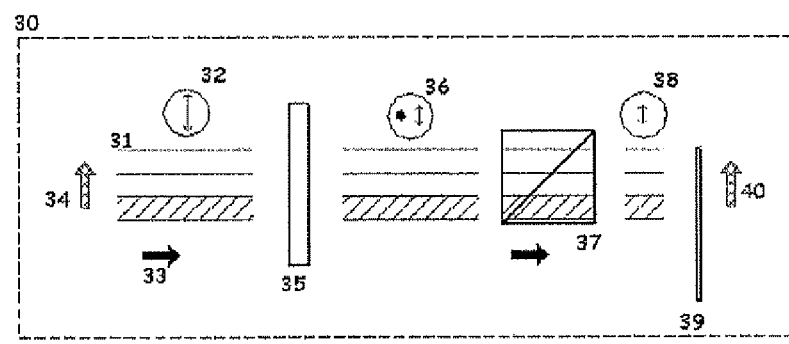
(a)
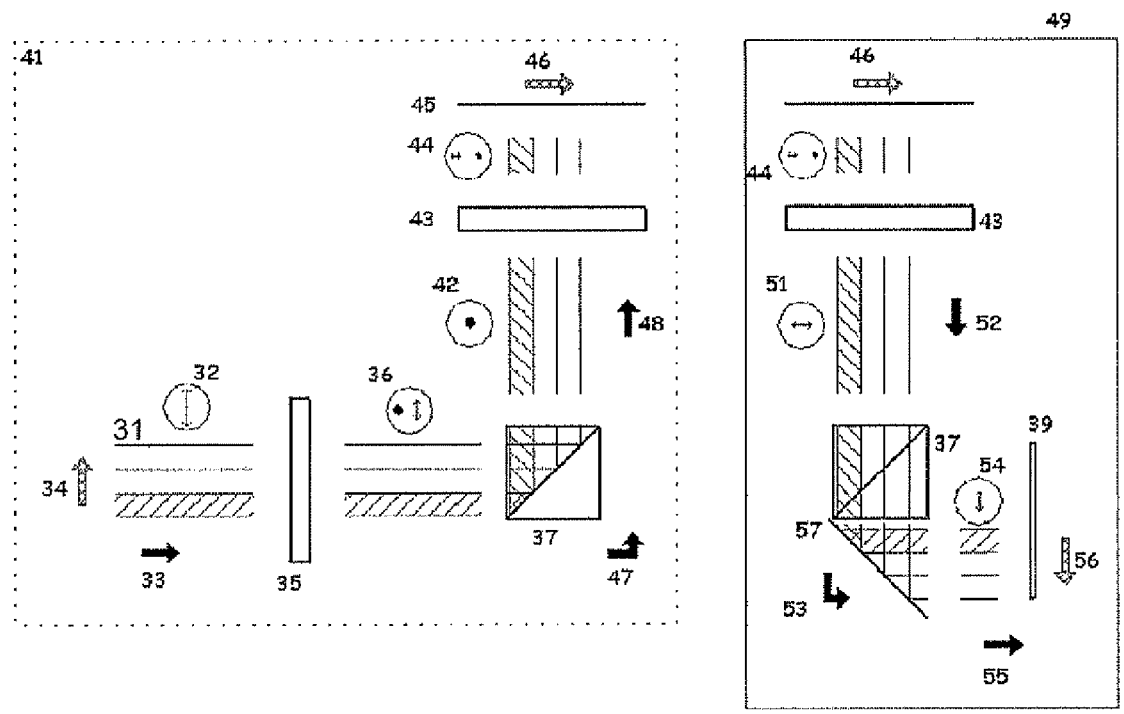
(b)
Fig. 6

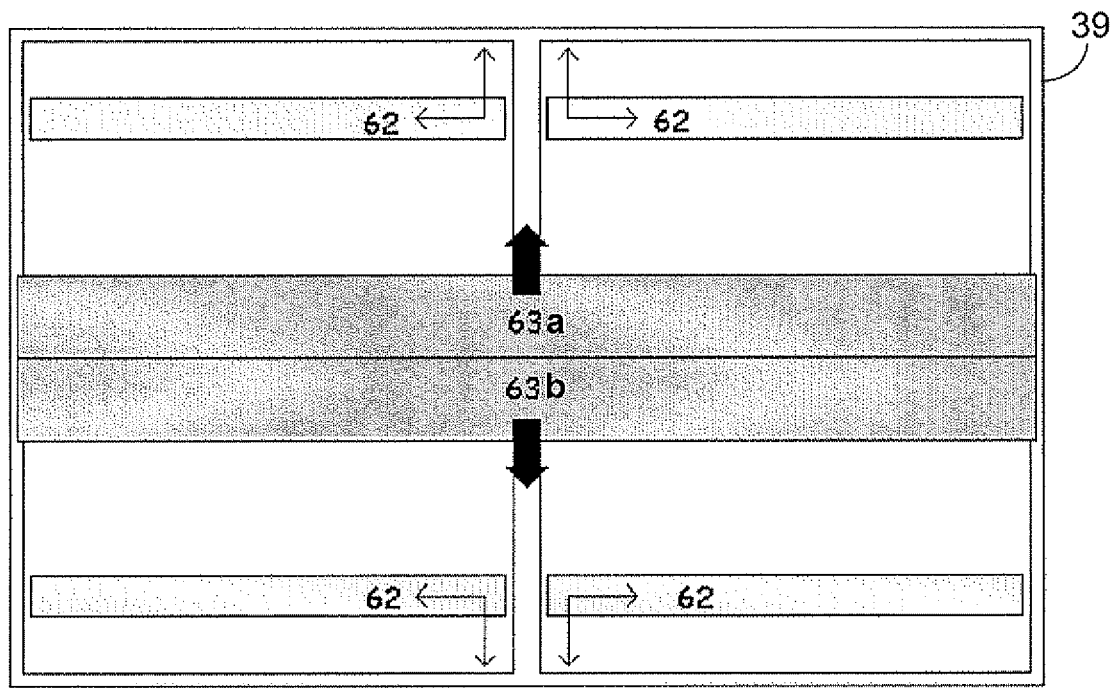
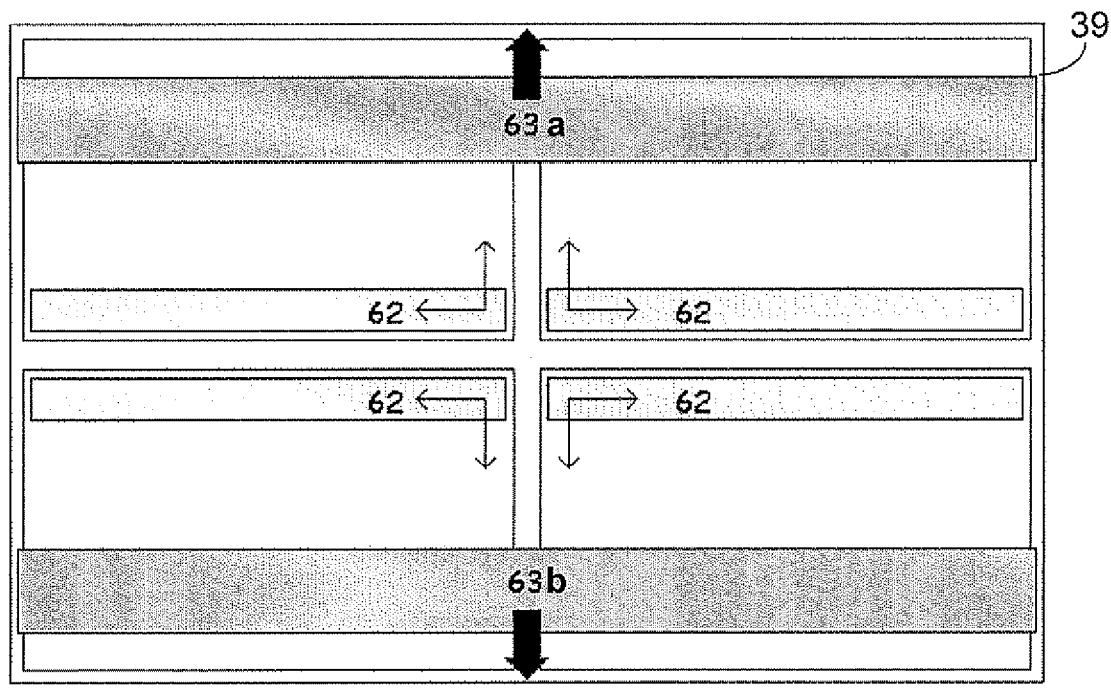
Fig. 7

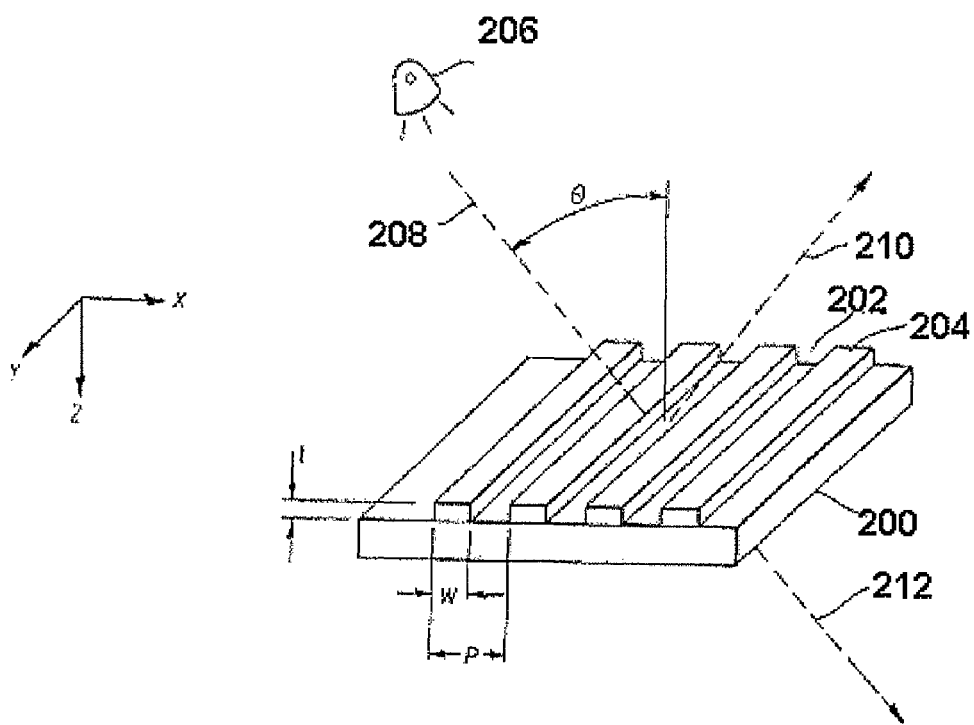
Fig. 11 - prior art
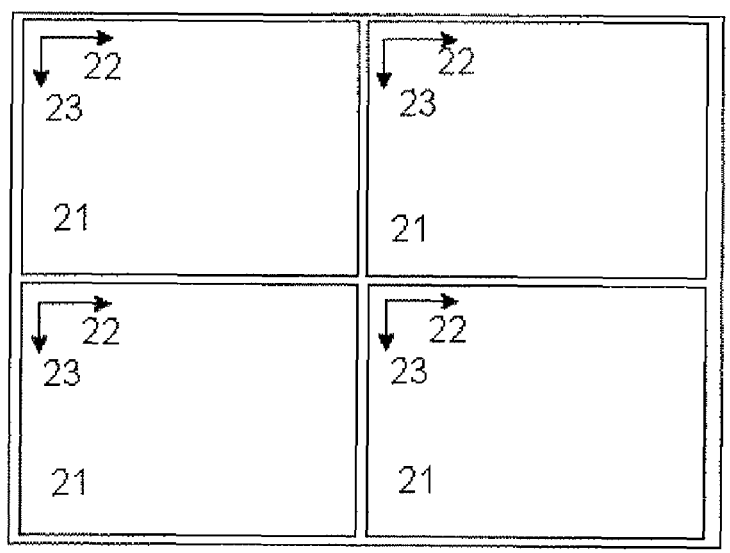
Fig. 13

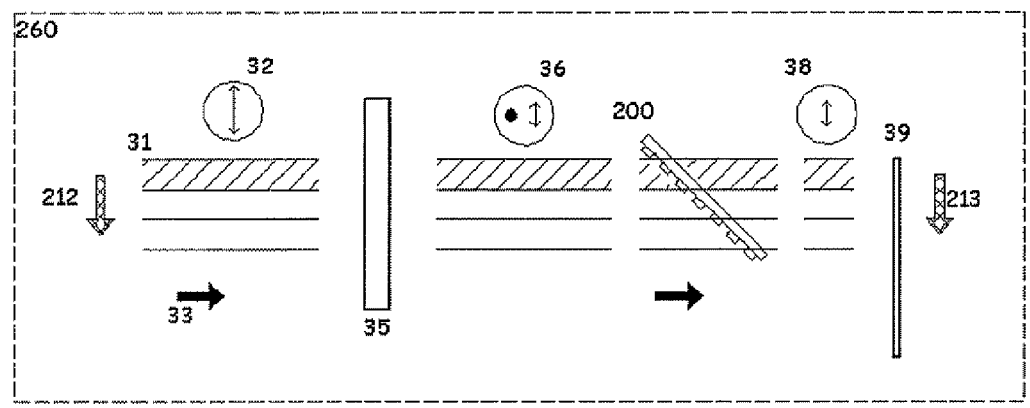
(a)
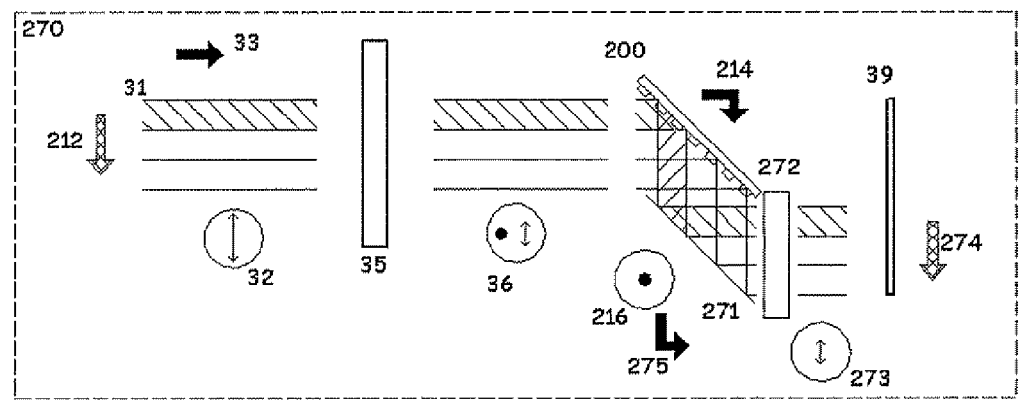
(b)
Fig. 12

SPLIT SCROLLING ILLUMINATION FOR LIGHT MODULATOR PANELS

TECHNICAL FIELD OF THE INVENTION

The present invention relates to the field of display devices with one or more spatial light modulator panels, such as e.g. liquid crystal device (LCD), liquid crystal on silicon (LCOS) devices or digital mirror devices (DMD), in particular spatial light modulator panels which are driven by simultaneously writing data to different portions spread over different zones of the light modulator panel, for example high resolution spatial light modulator panels. More particularly, the present invention relates to image display apparatus and methods for improving the display of moving images.

BACKGROUND OF THE INVENTION

Almost all common projection devices are based on one of the basic image modulator devices. Where the old technology using Cathode Ray Tubes (CRT) is almost completely outdated, the liquid crystal light valves (LCDs) and is the digital micro-mirror devices (DMDs) currently are used in most of the projectors. During the last years, a new liquid crystal technology, the so-called Liquid Crystal on Silicon (LCOS) has emerged. An LCOS chip is a reflective chip, where the liquid crystal basically only has half the thickness of a normal LCD. After transmission through the light modulating layer, the light is reflected and returns through the liquid crystal, so that the total light path in the liquid crystal is identical to the passage through a transmissive LCD. Light with altered polarization is split from the rest and is displayed on a display screen.

Analogous to the situation with normal LCDs, motion artefacts called smearing effects are introduced in LCOS. As described by Jun Someya (Information Display 10/05, p 12-16), this motion blur can be understood by a combination of two phenomena.

The first one (see FIG. 1) is specifically related to the nature of the liquid-crystal valves. If one visualizes the light intensity i (axis 12) of the liquid crystal as a function of time t (axis 11), it is clear from the graph in FIG. 1 that the response curve 13 is slow, and takes a certain time period $\Delta t$ to go from full black to full white. This time period can be split into two components, a delay time $\Delta t1$ during which the crystal starts to realize that the applied driving voltage has changed, and the rise time $\Delta t2$ which is needed for the liquid crystals to rotate. If one then considers moving image content, it is evident that a comet-like tail will be present, as the crystals always come slightly behind. During the timeframe 14 in which one image (frame) is displayed, the transition from 0 to 1 (e.g. black to white) takes almost the entire period. If the pixel should be black again in the next frame, it will again take more than half of the frame before the signal starts approaching 0. The slow response time of the liquid crystal cells is noticed when switching from black to white or vice versa, or from one grey level to another.

A second effect (which is not limited to liquid crystal valves) is the so-called sample and hold effect. If a point is moving fast across the image it is displayed at one certain position x during a complete frame. During the next frame, it is located somewhere else. The human eye follows the movement in a smooth way, but the illuminated pixel makes a jumping movement. On the is retina, the image and the eye attention point do not coincide and this causes blur, which is essentially the difference between the eye movement curve and the temporal position during one frame. One approach to reduce this problem has been described by Seiko Epson Corporation in EP-1575306 and is named scrolling illumination. Basically, what is does is blocking the light during a certain percentage of the frame (e.g. ½) so that during the delay time $\Delta t1$ and a part of the rise time $\Delta t2$, the light modulator is dark, e.g. not illuminated (no light reaches the light modulator). Only towards the end of a frame period 14, e.g. during the timeframe 15 as illustrated in FIG. 1, the light hits the light modulator.

In EP-1575306, the scrolling illumination is introduced by means of a rotating polygon prism 16, as illustrated in FIG. 2, which is in this case has a square base surface.

In FIG. 2, the time axis goes from top to bottom (time $t_0$ time $t_0+P$), and the bottom polygon position is identical to the top one, i.e. what is illustrated corresponds to a time period 14, i.e. 1 image frame.

The polygon prism 16 is rotated in such a way that that a parallel light bundle 17 is displaced with respect to its initial axis, by refraction in the material component, e.g. glass component, of the polygon prism 16. The displaced light spot hits a different zone 18 on a light modulator panel for each position of the prism 16. If at the position where the bundle 17 hits the light modulator panel a light valve is situated, the spot is scrolled across it (in the example illustrated e.g. from bottom to top, where it jumps towards the bottom again as the initial light ray sees the edge of the prism 16). It is evident that this polygon prism 16 can also be a hexagon or an octagon or any arbitrary symmetric polygon.

Typically, a light modulator panel, e.g. a liquid crystal light valve panel, of low or moderate resolution (whether it is reflective or transmissive) is 'written' row by row (or series of rows by series of rows), e.g. starting from the bottom and going to the top. This means that when image $I_o$ is written at time $t_0$, this actually starts happening e.g. at the bottom of the liquid crystal light valve panel, but only happens at time $t=t_0+P-\Delta t$ the top of the liquid crystal light valve panel, where P corresponds to the time period between two subsequent images (refresh rate), and where $\Delta t$ is a small time period. Analogously this writing process can be performed from top to bottom. Optimal performance can be seen when the scrolling light band is synchronized with the signal processing in such a way that the light band 18 is displayed where the image 19 has been written on the liquid crystal about half a period ago, as illustrated in FIG. 3. Then, only during timeframe 15 (occurring on these pixels), i.e. the end of the transition period, as illustrated in FIG. 1, the light is displayed, and the transition is no longer visible to the same amount as before. Scrolling illumination thus reduces blur.

The above solution for providing scrolling illumination, as illustrated in FIG. 2, comprises a rotating prism. Alternative solutions may comprise a rotatable drum comprising holographic elements disposed around the circumference of the drum or a rotatable disk having holographic stripes in a radial pattern on a surface of the disk, as described in WO 2003/055231, or a dynamic filter having a first region for transmitting a first portion of a light beam and a second region for rejecting a second portion of the light beam, as described in EP-1274256.

The LCOS technology enables light valve manufacturers to reduce the pixel size dramatically with respect to other light valves such as liquid crystals, as the electronic components can be positioned behind the silicon mirror which forms part of the LCOS light valve. As the pixel size can be dramatically reduced (values of 3.5 and 5 micron have been mentioned in future development plans by several companies such as e.g. Sony), the resolution of light modulator panels is inversely proportionally increased, leading to 1" diagonal light modulator panels with a resolution of e.g. 4000×2000 pixels. These pixels are no longer addressed the same way as the pixels of prior art moderate or low resolution light modulator panels, but other principles are used in high resolution panels 20. One such addressing scheme is demonstrated in FIG. 4, the addressing scheme involving simultaneous addressing of four quadrants 21. In this case, the light valves at the centre of the light modulator panel 20 are first altered (row by row in directions 22), after which the zones of alteration spread towards the top and bottom, in directions 23, of the respective quadrants 21 of the light modulator panel 20. As a consequence the known illumination methods with a scrolling light band as described above are no longer applicable.

There is a need for other illumination solutions, adapted to the new driving schemes where data is synchronously written to different zones of light modulator panels.

SUMMARY OF THE INVENTION

It is an object of embodiments of the present invention to provide good apparatus or methods for displaying images, e.g. high resolution images.

The above objective is accomplished by a method and device according to the present invention.

In a first aspect, the present invention provides a display system comprising,
illumination means for providing a light beam,
at least one colour channel, each colour channel being adapted for providing at least part of the light beam to a spatial light modulator panel comprising at least a first and a second zone; the spatial light modulator panel being for selectively modulating an impinging beam of light to form an image light beam, the display system further comprising splitting means for splitting the at least part of the light beam so that a split light beam is provided on the spatial light modulator panel, the split light beam comprising at least a first and a second sub-beam,
and driving means for driving the first and second sub-beams such that the first sub-beam scrolls over the first zone and the second sub-beam scrolls over the second zone. Preferably the first sub-beam scrolls only over the first zone and the second sub-beam scrolls only over the second zone.

In embodiments of the present invention, the spatial light modulator panel may be a reflective or a transmissive panel.

The driving means may be a single driving means for synchronously driving the first and second sub-beams.

In embodiments of the present invention, the driving means may be adapted for scrolling the first sub-beam and the second sub-beam over the first and second zone, respectively, in different directions. These different directions may be opposite directions, e.g. the first sub-beam may scroll over the first zone from top to bottom while the second sub-beam scrolls over the second zone from bottom to top, or vice versa. In alternative embodiments of the present invention, the driving means may be adapted for scrolling the first sub-beam and the second sub-beam over the first and second zone, respectively, in the same direction. The first and second sub-beams may for example both be scrolled over the first and second zones, respectively, from top to bottom, or both from bottom to top.

In embodiments of the present invention, the light beam emanating from the illumination means may be a parallel beam. In alternative embodiments, the light beam may not be a parallel beam, and means, e.g. optical elements, may be provided to convert the non-parallel beam into a substantially parallel beam, i.e. a light beam with a low divergence. In embodiments of the present invention, size of the light beam hitting the first and second zones is substantially identical.

Suitable optical elements may be provided to make the size of the light beam hitting the first zone substantially identical to the size of the light beam hitting the second zone, or vice versa.

In embodiments of the present invention, the light beam provided by the illumination means may comprise a first portion of light with a first polarisation direction and a second portion of light with a second polarisation direction perpendicular to the first polarisation direction. The illumination means may provide such light beam comprising a first portion of light with a first polarisation direction and a second portion of light with a second polarisation direction perpendicular to the first linear polarisation direction, or the light beam emanating from the illumination means may be converted into a light beam comprising such first and second portions. The illumination means may provide a polarised light beam, e.g. a linearly polarised light beam, a circularly polarised light beam or an elliptically polarised light beam. In case of an elliptically polarised light beam, the display system furthermore comprises means, e.g. optical elements, to adapt the effective brightness of the sub-beams hitting the light modulator panel. The adaptation may consist of making the brightness of the sub-beams substantially equal. In alternative embodiments, the adaptation may consist in taking into account the brightness differences of the sub-beams in the driving of the different zones of the spatial light modulator panel. This way, a correction for the non-uniformities in the final displayed image is provided.

In embodiments of the present invention, the splitting means, e.g. polarising beam splitter or wire grid polariser, is adapted for directing the first portion of the light which has the first polarisation direction along a first path, and for directing the second portion of the beam of light which has the second polarisation direction along a second path, the first and the second path being different from each other. In particular embodiments, the first and the second path may be orthogonal to each other.

Light on the first path may form the first sub-beam for scrolling over the first zone of the spatial light modulator panel and light on the second path may form the second sub-beam for scrolling over the first zone of the spatial light modulator panel. The first path and the second path thus lead to different zones on the spatial light modulator panel. Light on the first path is intended for illuminating a first portion of the spatial light modulator panel and light on the second path is intended for synchronously illuminating a second portion of the spatial light modulator panel.

A display system according to embodiments of the present invention may furthermore comprise optical elements, for example but not limited thereto, lenses, mirrors, polarizing beam splitters, wire grid polarisers or holographic components, in the first path for directing the first sub-beam to a first zone on the spatial light modulator panel, and optical elements in the second path for directing the second sub-beam to a second zone on the spatial light modulator panel.

In embodiments of the present invention, the driving means may comprise a dynamic light modulator for modulating the location of the first and second sub-beams impinging on their respective zones of the spatial light modulator panel.

The display system according to embodiments of the present invention may be part of a projection system, e.g. an LCD or an LCOS projection system. A projection system incorporating a display system according to embodiments of the present invention is also an embodiment of the present invention.

In a second aspect, the present invention provides the use of a display system according to embodiments of the present invention with an LCD or an LCOS projector.

In a third aspect, the present invention provides a method for producing an image. The method comprises:
providing a scrolling illumination light beam on a light modulator panel in a colour channel, the light modulator panel comprising at least two zones, wherein providing the scrolling illumination light beam comprises providing a split light beam comprising at least a first and a second sub-beam, the first sub-beam scrolling over the first zone and the second sub-beam scrolling over the second zone. Preferably the first sub-beam scrolls only over the first zone and the second sub-beam scrolls only over the second zone.

Providing the scrolling illumination sub-beams may comprise providing scrolling of the sub-beams in different, e.g. opposite, directions. Alternatively, providing the scrolling illumination sub-beams may comprise providing scrolling of the sub-beams is the same direction.

A method for producing an image in accordance with embodiments of the present invention may furthermore comprise controlling synchronisation between the driving of the scrolling of the first and second sub-beams over the first and second zones, respectively, and the switching of the light valves of the spatial light modulator panel.

The above-described synchronisation in the method embodiments of the present invention may be implemented in a processing system. Such processing system may include at least one programmable processor coupled to a memory subsystem that includes at least one form of memory, e.g., RAM, ROM, and so forth. It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system may include a storage subsystem that has at least one disk drive and/or CD-ROM drive and/or DVD drive. In some implementations, a display system, a keyboard, and a pointing device may be included as part of a user interface subsystem to provide for a user to manually input information. Ports for inputting and outputting data also may be included. More elements such as network connections, interfaces to various devices, and so forth, may also be included. The various elements of the processing system may be coupled in various ways, including via a bus subsystem including a system of at least one bus. The memory of the memory subsystem may at some time hold part or all of a set of instructions that when executed on the processing system implement the steps of the method embodiments described herein. Thus, while a processing system per se is prior art, a system that includes the instructions to implement aspects of the methods for obtaining information for or for optimising of the lithographic processing of a substrate is not prior art.

The present invention also includes a computer program product which provides the functionality of the synchronisation in methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a memory key, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

In yet a further aspect, the present invention provides a control unit for use with a display system, the display system comprising
illumination means for providing a light beam,
at least one colour channel, each colour channel being adapted for providing at least part of the light beam to a spatial light modulator panel comprising at least a first and a second zone each comprising light valves,
splitting means for splitting the at least part of the light beam so that a split light beam is provided on the spatial light modulator panel, the split light beam comprising at least a first and a second sub-beam, and
driving means for driving the split light beam so that the first sub-beam scrolls over the first zone and the second sub-beam scrolls over the second zone. Preferably the first sub-beam scrolls only over the first zone and the second sub-beam scrolls only over the second zone.

The control unit is adapted for controlling synchronisation between the driving of the dynamic light modulator panel and the switching of the light valves of the spatial light modulator panel.

The present invention provides a method to modulate the illumination system so that light valves or picture elements of a spatial light modulator panel are only illuminated when the switching of those elements is substantially completed. The illumination does not illuminate all of the picture elements of a spatial light modulator panel, but only part of them, and means are provided to let this illuminated part traverse over the panel, e.g. scroll over the panel.

It is an advantage of embodiments of the present invention that limited, e.g. reduced, smearing may be obtained.

It is a further advantage of embodiments of the present invention that display systems with low latency are obtained.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 2 illustrates a prior art solution for providing scrolling illumination by means of a rotating prism.

FIG. 3 illustrates that with scrolling illumination switching of the light valves can be separated in time from illumination of the light valves.

FIG. 4 illustrates one embodiment of a driving scheme of a high resolution light modulator panel which can be used with embodiments of the present invention, the driving scheme comprising simultaneously addressing four quadrants of the light modulator panel.

FIGS. 6(*a*) and 6(*b*) illustrate, for one colour channel of for example a system as illustrated in FIG. 5, how light bands are scrolling simultaneously over different zones of a light modulator panel in accordance with embodiments of the present invention. FIG. 6(*a*) illustrates the part of the set-up generating the scrolling illumination on the top part of the light modulator panel and FIG. 6(*b*) illustrates the part of the set-up generating the scrolling illumination on the bottom part of the light modulator panel.

FIG. 7 shows a front view of a light modulator panel over which two light portions scroll, the light portions and the scrolling being as provided by a set-up as in FIGS. 6(*a*) and 6(*b*).

FIG. 11 illustrates a wire-grid polarizer as known from the prior art.

FIGS. 12(*a*) and 12(*b*) illustrate yet another embodiment of an optical set-up in accordance with embodiments of the present invention which produces two scrolling illumination bands which synchronously scroll over respective portions of a light modulator panel.

FIG. 13 illustrates a driving scheme with which the split scrolling provided by the set-up of FIGS. 12(*a*) and 12(*b*) may be used.

Figure 1:
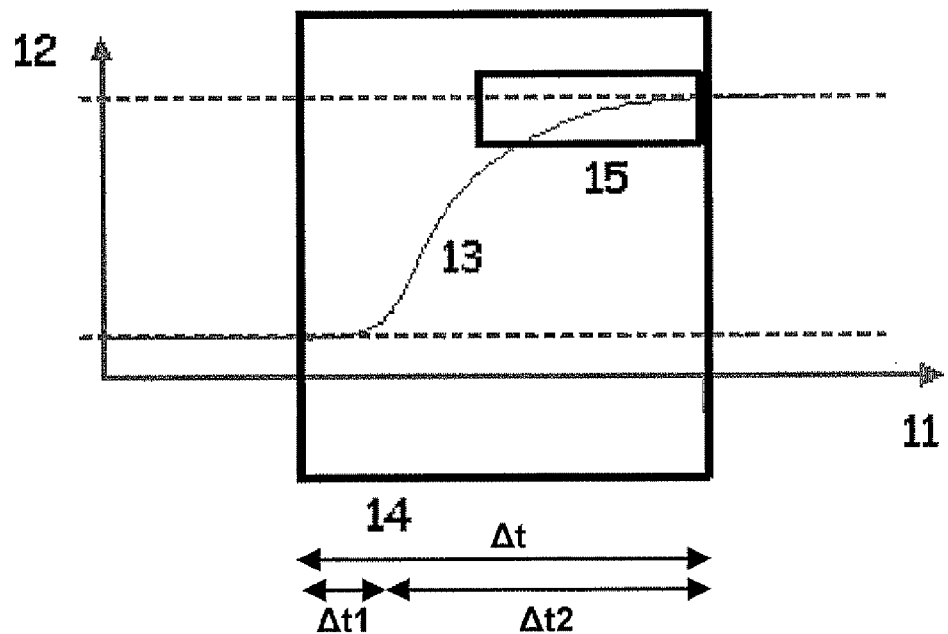
FIG. 1 is a graph illustrating the response curve of a light valve, e.g. a liquid crystal valve, over time to a drive signal for switching from full black to full white.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under, upward, downward, left, right and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention, the invention being limited only by the terms of the appended claims.

The LCOS technology for imaging applications, e.g. projection devices, introduces the possibility to increase the light modulator panel resolution dramatically. Scrolling illumination is a method developed to reduce the typical smearing effects seen on light modulator panels such as e.g. LCD and LCOS panels. With the changing methods to address the pixels in the high resolution light modulator panels the scrolling illumination principle has to be adapted, and the present invention provides a solution to do this.

One embodiment of a solution according to the present invention is demonstrated in FIGS. 6 and 7. However, the invention is not limited to the specific driving scheme of FIG. 4, but also includes other driving schemes in which several zones are addressed in a sufficiently symmetric way. A first and a second zone are addressed in a "sufficiently symmetric way" if the second zone can be addressed by translation, or mirroring around an axis, of the addressing of the first zone. Other embodiments of the present invention, for the alternative driving schemes of FIG. 9 and FIG. 13, respectively, are for example illustrated in FIG. 8 and FIG. 12.

Embodiments of the present invention may for example be used in a projection system, although embodiments of the present invention may also be used in other light modulator display systems, such as e.g. LCOS or LCD display screens, for example for computer vision or television applications.

The display system, e.g. projection system, may be a monochromatic display system or a colour display system. A colour display system may be full colour system using a single light modulator panel (in which images of different colours are sequentially produced and imaged in rapid succession; also called a colour-sequential system) or a full colour system using a multi-colour modulator system (in which images of different colours are produced simultaneously and combined with each other to from the full-colour image), e.g. three colours RGB.

Hereinafter, a full colour projection system using a multi-colour modulator system is described in more detail. This, however, is not intended to be limiting for the present invention, neither with respect to the display system being a projection system, nor with respect to the display system being a full-colour system.

Figure 5:
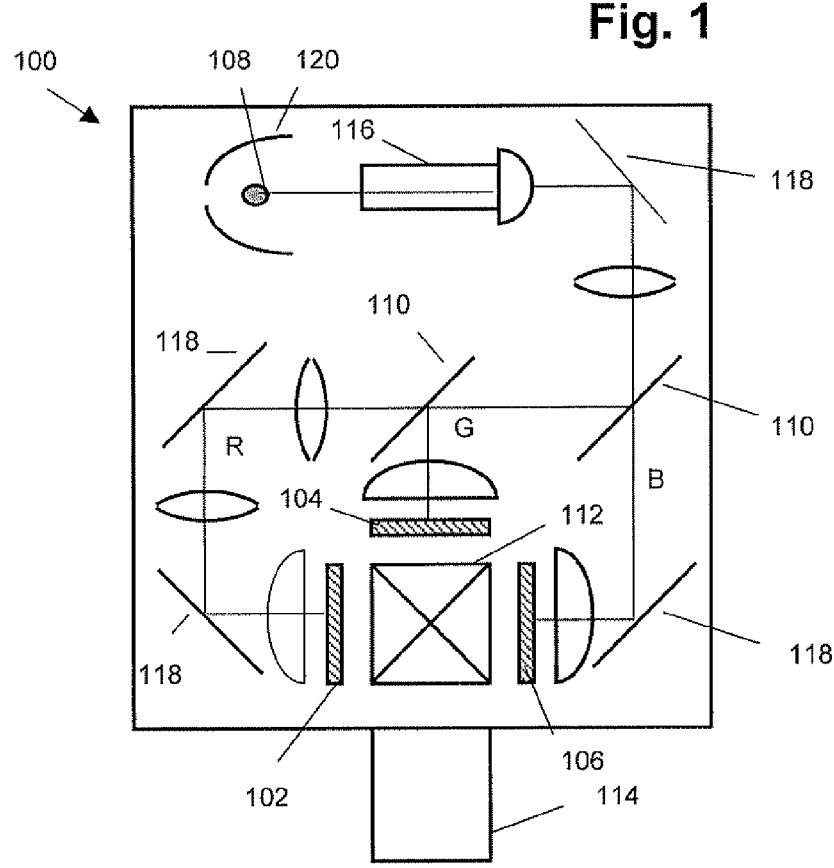
FIG. 5 is a schematic view of the main parts of a projector apparatus provided with three transmissive light modulator panels which can be used with embodiments of the present invention.

FIG. 5 is a schematic view of the main parts of a projector apparatus 100 provided with 3 transmissive light modulator panels 102, 104, 106 in accordance with embodiments of the present invention. The present invention, however, is not limited to transmissive systems; the method of embodiments the present invention can also be used with reflective systems, in particular LCOS systems or DMD systems, and embodiments of the present invention also include reflective display systems.

The projector apparatus 100 illustrated in FIG. 5 comprises a light source 108, e.g. a white light source; a colour separating optical system, a plurality of dichroic mirrors 110, for separating an illumination bundle emanating from the light source 108 into a plurality, for example three, light colour components, e.g. red, green and blue; a plurality of light modulator panels 102, 104, 106 for each selectively modulating an impinging beam of one particular light colour component so as to form an image beam to be to projected for that colour component, e.g. light modulator panel 102 for red, light modulator panel 104 for green and light modulator panel 106 for blue; a combining device 112 for combining the image beams for the particular colour components into an image beam for projection; and a projection lens or projection lens system 114 for projecting the combined image beams on a projection surface such as for example a display screen (not illustrated).

Light from the light source 108, for example, a metal halide or xenon lamp, but not limited hereto, may optionally be collected by an optical system 116 for obtaining a uniform illumination. This system 116 can be e.g. a combination of a light tunnel and a lens. In embodiments of the present invention, the light emitted by the light source 108 may be white light. In embodiments of the present invention, the light bundle emitted by the light source 108 may be substantially parallel, or optical means may be provided to make the emitted light bundle parallel; however, this is not necessary. In particular embodiments of the present invention, critical components of the system are illuminated in a substantially similar way for all sub-beams. Critical components are, for example, but not necessarily limited thereto, light splitting means and zones of the spatial light modulator panels. The light source 108 may be provided with a surface reflector 120, e.g. an elliptical or a parabolic surface reflector, for collection of light.

Optical elements, e.g. mirrors 110, are provided to direct the colour components to the respective light modulator panels 102, 104, 106 in co-operation with other mirrors 118.

Light impinging on the light modulator panels 102, 104, 106 is selectively modulated, depending on the driving signal applied to the modulator panels 102, 104, 106, thus generating single colour images, which are combined by means of the combining device 112, e.g. a prismatic unit, into the image beam for projection.

For high resolution light modulator panels, scrolling illumination may be provided by means of a dynamic light modulator such as e.g. a rotating prism or a rotating wheel with a spiral pattern of transmissive and non-transmissive (reflective or absorbing) zones.

Embodiments of the present invention are particularly useful for being used with a projector apparatus, e.g. a projector apparatus 100 as described, where the light modulator panels are high resolution panels, e.g. 4×2 k panels. Alternatively, embodiments of the present invention can be used with a projector apparatus, e.g. a projector apparatus 100 as described, with lower resolution panels, in order to make them faster, and therefore possibly useful for stereo applications (e.g. with double refresh rate).

One embodiment of the present invention, in one colour channel, is illustrated in FIGS. 6 (a) and (b).

In the example illustrated, it is assumed to have a light beam 31 which is linearly polarized and has a first polarisation direction 32 (polarisation in the present description is always depicted in a circle), e.g. p-type polarisation, which propagates from left to right in the drawings (see arrow 33; solid arrows indicate direction of propagation), i.e. from the light source 108 (not illustrated in FIG. 6) to the light modulator panel 39. The light beam 31 is located behind a system introducing scrolling illumination (not illustrated in FIG. 6) as for example described with regard to the prior art. The scrolling illumination can for example be provided by means of a rotating prism, or by means of a rotating wheel having a spiral pattern of transmissive and non-transmissive (absorbing or reflective) zones thereon. The scrolling of the light beam, illustrated by dashed arrow 34, in the example illustrated in FIG. 6 occurs from bottom to top. The dashed zone in the light beam 31 indicates the location of the bright band at time $t_0$. For simplicity, it is assumed that the light bundle is parallel or substantially parallel, which means that all rays have the same or substantially the same direction of propagation. The invention, however, is not restricted to this situation. A device according to embodiments of the present invention may comprise more optical components to obtain a substantially parallel light bundle from a non-parallel bundle, or other optical components so that the shape of the light bundle is identical to the parallel case on the surfaces where the image formation takes place.

The light bundle 31 is converted into a light bundle of which a first portion has the first polarisation direction, and a second portion has a second polarisation direction perpendicular to the first one. This may be obtained by having the light bundle 31 cross a suitable polarisation conversion element 35, e.g. a birefringent material such as a 45° retarder film or a component with similar influence on the polarization of the light. Due to this polarisation conversion element, e.g. film 35, the polarisation remains linear, but it is rotated over 45° with respect to its initial axis. Behind the polarizer 35, the polarisation 36 of the light beam has altered and can be broken down in a portion with the same polarisation as before, e.g. p type polarisation, and a component with a polarisation state perpendicular to this one, e.g. s type polarisation.

By starting off from a linearly polarised bundle 31 having only a single polarisation type of light, as described above, and transforming this bundle into a bundle comprising two light portions having perpendicular polarisation types, equal light portions may be obtained. This is advantageous, as this will result in scrolling illumination bundles having equal intensity. Nevertheless, starting off from a linearly polarised light bundle having only a single polarisation type of light is not necessary. When starting from a linearly polarised light bundle comprising two perpendicular polarisation types, these can be split up, and if necessary, e.g. if the two light portions having perpendicular polarisation types are strongly different, additional means can be provided for equalising the intensities of both light portions (amplifying the portion with the lowest intensity or reducing the portion with the highest intensity).

Moreover, in the example illustrated in FIG. 6, the scrolling action is provided before providing the polarised light bundle having the two portions with perpendicular polarisation directions. In alternative embodiments, the scrolling action can be provided after provision of the polarised light bundle having the two portions with perpendicular polarisation directions, e.g. by providing a dynamic light modulator such as e.g. a rotating prism or a rotating wheel with a spiral pattern of transmissive and non-transmissive (reflective or absorbing) zones after the polarisation conversion element 35.

The scrolling polarised light bundle having the two portions with perpendicular polarisation directions is then split into two separate bundles, one comprising the light with the first polarisation direction and one comprising the light with the second polarisation direction. This splitting may be performed e.g. by means of a suitable material, e.g. birefringent material, providing the decomposition of the light bundle comprising the two polarisation types into two light bundles each comprising only one of the polarisation types. One example of such birefringent material is a polarising prism or polarising beam splitter (PBS) 37, e.g. a Nicol prism.

With respect to the polarizing beam splitter 37 (hereafter called PBS), the first beam having the first type of polarisation direction can for example be called p-polarized (parallel, i.e. in the plane of the paper, which is the plane formed by the direction of propagation axis and the line which corresponds to the transition zone in the PBS). The second beam is the s-polarized beam (senkrecht=perpendicular, i.e. perpendicular to the plane of the paper, for this reason it is shown as a dot). The PBS treats the two polarisation states differently; e.g. it transmits the p-polarized light and reflects the s-polarized light.

The transmission case 30, illustrated in FIG. 6(a), leads to a light beam having only part of the intensity of the light beam 31 it started from, e.g. half the intensity where it started from if the beam 31 is split into two equal parts, but having a first polarisation type, e.g. p-polarisation 38. In alternative embodiments, the transmission case leads to a light beam of reduced intensity with respect to the light beam 31 it started from, the reduction being different from 50%.

After having passed the element which provides the decomposition of the light beam, e.g. the PBS 37, the light bundle with the first polarisation type 38 is impinged on a zone of the light modulator panel 39. At the light modulator panel 39, a portion of the upper half of this light modulator panel 39 is illuminated by this light bundle with the first polarisation type 38. Due to the scrolling 34 of the light beam 31 from bottom to top (in the example given), the light beam impinging on the element which provides the decomposition of the light beam, e.g. the PBS 37, also scrolls from bottom to top, and thus is passed from bottom to top, thus providing a scrolling band 63a (see FIG. 7) on the light modulator panel 39 which scrolls in a direction 40 from centre to top. When the scrolling 34 of the original light beam 31 has reached the top, it jumps back to the bottom, which corresponds to the scrolling band 40 on the light modulator panel 39 jumping back to the centre.

In the reflection case 41, illustrated in FIG. 6(b), focus is laid on the portion of the light having the second linear polarisation type, e.g. in the example illustrated the s-light. The element which provides the decomposition of the light beam, e.g. the PBS 37, reflects this portion of the light towards another direction than the passing direction of the first portion of the light having the first linear polarisation direction, in the example illustrated to the top 47. The light beam redirected in that other direction 47 then has the second polarisation type, e.g. s-polarisation 42, with only a portion, e.g. half, the intensity of the original beam. This second portion of the light beam moves upwards in direction 48 and is converted into light with the first polarisation direction, and is redirected to the light modulator panel. According to embodiments of the present invention, this conversion and redirection may be obtained by first converting the light beam into a light bundle of which a first portion has the first polarisation direction, and a second portion has a second polarisation direction perpendicular to the first one, e.g. by having the light bundle cross a suitable polarisation conversion element 43, e.g. a birefringent material such as a 45° retarder film or a component with similar influence on the polarization of the light. After transmission through the converter 43, the polarisation state of the light 44 has altered, and consists of a first portion of second polarisation type of light and a second portion of first polarisation type of light, e.g. ½ s-light and ½ p-light. This light bundle reaches a mirror 45, where scrolling in a direction 46, generated by the scrolling 34 from bottom to top of the original light bundle, occurs from left to right. After reflection on the flat mirror 45, the light follows the same path down 52, as shown on inset 49 in FIG. 6(*b*). The polarisation 44 is not altered due to the reflection on the mirror 46. After passing again through the polarisation conversion element 43, e.g. a birefringent material such as a 45° retarder film or a component with similar influence on the polarization of the light, the polarisation of the second portion of the light beam with second type of polarisation 42, e.g. s-polarisation, has altered to pure first type of polarisation, e.g. pure p-polarisation 51.

The light bundle may be transmitted through the PBS 37 again. As the light has the first type of linear polarisation, it will pass through the PBS 37. Behind the PBS 37, the first polarisation type of light impinges on another mirror 57, which does not affect the polarisation state 54 but only alters the direction of propagation 53 of the light beam. The resulting light bundle moves to the right, direction indicated by arrow 55 in FIG. 6(*b*), towards the bottom half of the light modulator panel 39.

When the original light bundle scrolls from bottom to top, indicated by arrow 34, the corresponding light bundle scrolls from left to right on the mirror 45, and the resulting light bundle has a scrolling direction 56 from top to bottom on the bottom part of the light modulator panel 39. It can thus be seen that this second portion of the original light bundle will scroll on the light modulator panel 39 from the centre to the bottom. Upon reaching the bottom of the light modulator panel 39, the light bundle will jump back to the centre.

If the light modulator panel 39 is a transmissive light modulator panel, i.e. comprises transmissive light valves, e.g. liquid crystal cells, the light will go further to the right after being selectively modulated by the light modulator panel 39. If, in alternative embodiments, the light modulator panel 39 is reflective, the light will return from the panel 39 and an additional polarizing beam splitting component 406 in between PBS 37, mirror 57 and light modulator panel 39 will be needed to select the modulated light and send it towards typically a projection lens. An implementation hereof is exemplified in the system illustrated in FIG. 14.

As demonstrated in FIGS. 6(*a*) and (*b*), as well as in FIG. 7, the scrolling of the original light beam 31 from bottom to top, combined with the splitting of the light beam into two portions will introduce de desired effect on the light modulator panel 39.

In FIG. 7, the light modulator panel 39 is shown at two discrete moments in time, the situation at the first moment in time being illustrated in the top part of the drawing, and the situation at the second moment in time being illustrated in the bottom part of the drawing. At moment $t_0$, the light band 63*a*, 63*b* is located in the centre of the light modulator panel 39. One half of the light band, the upper part 63*a*, is due to the light bundle 38 that went straight through the PBS 37 in the embodiment illustrated in FIG. 6. The lower half 63*b* of the light band is due to the light bundle 54 that was first reflected by the PBS 37, and then redirected towards the modulator panel 39 after its polarisation direction having been changed. The situation illustrated corresponds with the original light bundle 31 being at the bottom of its scrolling movement.

In the bottom part of FIG. 7, the situation is illustrated somewhat more than half the frame rate later, where the top part 63*a* of the light band has moved up over the light modulator panel 39, while the bottom part 63*b* of the light band has synchronously moved down over the light modulator panel 39. This situation corresponds with the original light bundle 31 being at an intermediate position between the bottom and the top position. It is clear from the illustration in FIG. 7 and from the foregoing description that the two light bands 63*a*, 63*b* move in opposite directions. In alternative embodiments, however, both light bands can move synchronously in a same direction, e.g. both up or both down, over different zones of the modulator panel.

This movement or scrolling of the light bands 63*a*, 63*b* over the light modulator panel 39 can be synchronised with the movement of the zones 62 where the data is written to the light valves, e.g. LC or LCOS light valves. The data for each zone 21 may be generated by a separate image generator (IG). It is advantageous if the synchronisation between writing of data to the light valves and the scrolling of the illumination over the light modulator panel is such that there is a delay of about half the frame rate at which the images are refreshed, although the present invention is not limited thereto. Changing the speed of movement of the light bands over the light modulator panel 39 may be performed by a corresponding change of the speed of scrolling of the original light bundle 31.

It can be seen, in particular from the bottom part of FIG. 7, that the moving of the light bands 63*a*, 63*b* is preceded by the movement of the zones 62 where the data is written to the light valves. This way the light valves are already provided with the data which corresponds to the next image frame, but they will only show that data when they are illuminated by the respective light bands 63*a*, 63*b*. By this method, the scrolling illumination, known for low or modest resolution panels, has been adapted to an illumination system for high resolution panels in which the data is written simultaneously in different portions over different zones of the light modulator panel.

It is to be understood that although preferred embodiments, specific constructions and configurations, have been discussed herein for devices according to the present invention, various changes or modifications in form and detail may be made without departing from the scope of this invention as defined by the appended claims. Functionality may be added or deleted from the set-ups and operations may be interchanged among each other.

Figure 8:
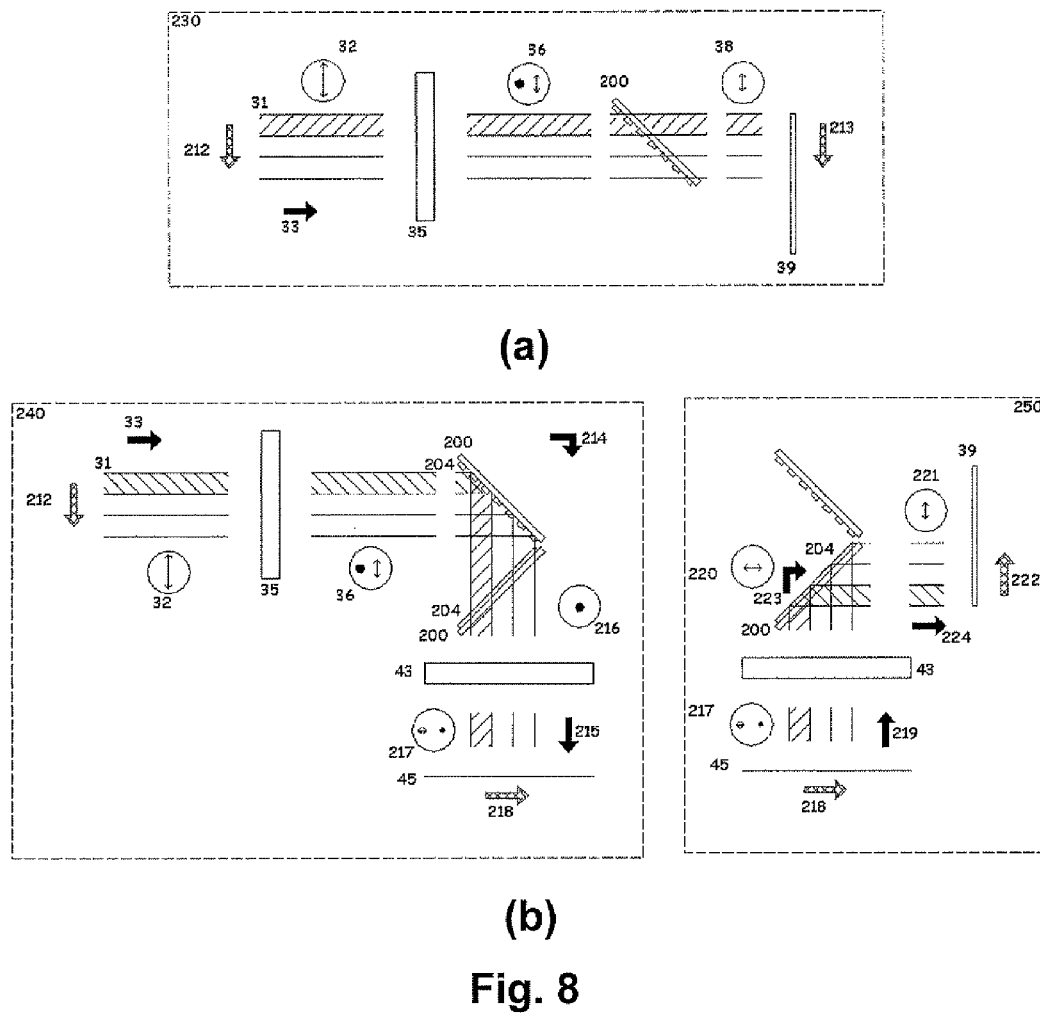
FIGS. 8(*a*) and 8(*b*) illustrate another embodiment of an optical set-up in accordance with embodiments of the present invention which produces two scrolling illumination bands which synchronously scroll over respective portions of a light modulator panel.
Figure 9:
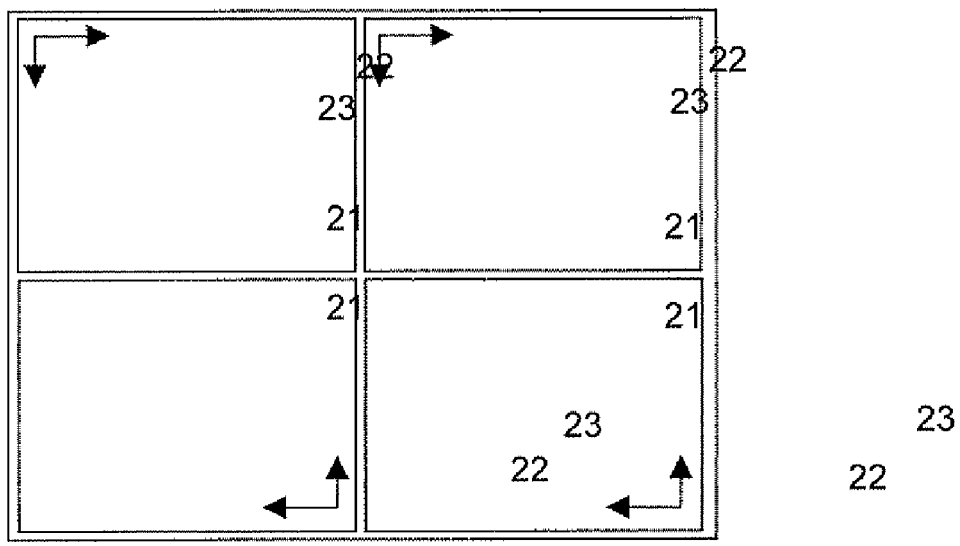
FIG. 9 illustrates a driving scheme with which the split scrolling provided by the set-up of FIGS. 8(*a*) and 8(*b*) may be used.
Figure 10:
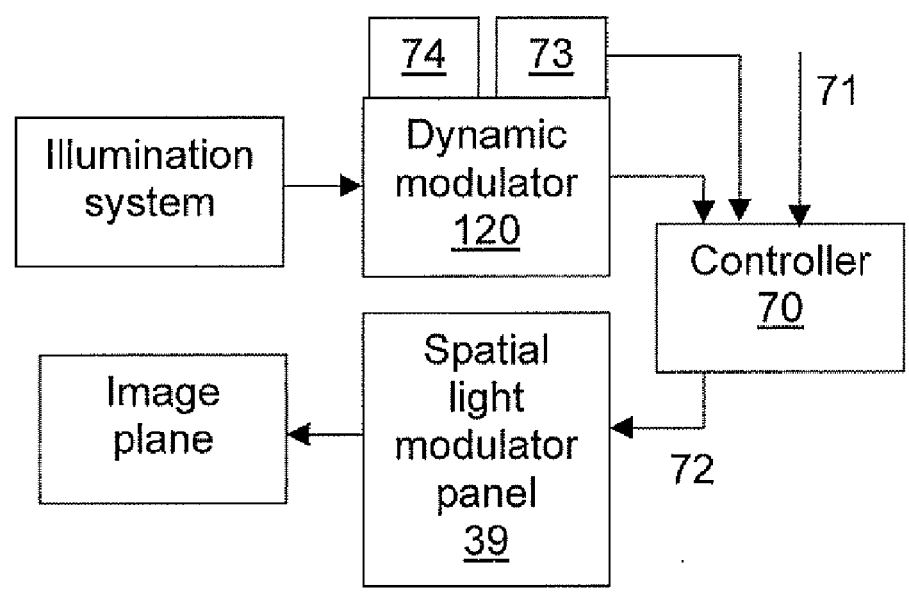
FIG. 10 is a schematic block diagram of a display system according to embodiments of the present invention.

For example, an alternative embodiment of the present invention is illustrated in FIG. 8, for use with an alternative drive scheme as illustrated in FIG. 9. In the alternative drive scheme, the light modulator panel is divided into four zones, 2×2. Data is written to the top zones from top to bottom, and to the bottom zones from bottom to top, i.e. opposite to the situation in FIG. 4. The split scrolling illumination in accordance with embodiments of the present invention follows the writing of the data to the zones of the light modulator panel, i.e. the illumination bundles scroll over the zones 21 from top to bottom in the upper half of the light modulator panel, and from bottom to top in the bottom half of the light modulator panel.

For obtaining split scrolling of the light bundles over the light modulator panel in accordance with this embodiment, the setup provided in FIG. 6 can be used, provided the scrolling of the light bundle is reversed. But also a set-up according to FIG. 8 may be provided, making use of two so-called wire-grid polarizers 200. As described in US2004070829 and in FIG. 11, a glass plate or dielectric substrate 202 covered with a multiplicity of parallel conductive electrodes (wires) 204 for example acts as a polarisation selective device. The pitch p, width w and thickness t of the conductors determine the operation wavelength. A light beam 208 generated by a light source 206 has an angle of incidence θ on the polarizer. The plane of incidence is chosen to be orthogonal to the conductive elements. The wire grid polarizer 200 divides the beam into a specularly reflected light beam 210 and a transmitted light beam 212. The standard definitions of s and p polarisation for first and second type polarisation can be used, such that the light with s polarisation has the polarisation vector orthogonal to the plane of incidence (and thus parallel to the conductive elements). Conversely, light with p polarisation has the polarisation vector parallel to the plane of incidence and thus orthogonal to the conductive elements. In general, p-light is transmitted, s-light is reflected.

When returning to FIG. 8, a system introducing scrolling illumination is provided (not illustrated in FIG. 8), as for example described with regard to the prior art. The scrolling illumination can for example be provided by means of a rotating prism, or by means of a rotating wheel having a spiral pattern of transmissive and non-transmissive (absorbing or reflective) zones thereon. In the transmission case 230, the scrolling light bundle 31 follows the direction 33 (see FIG. 8a). It is to be noted that the scrolling direction, illustrated by dashed arrow 212, has been altered with respect to FIG. 6. For simplicity, it is assumed that the light bundle is parallel, which means that all rays have the same direction of propagation. The invention, however, is not restricted to this situation. A device according to embodiments of the present invention may comprise more optical components to obtain a parallel light bundle from a non-parallel bundle, or other optical components so that the shape of the light bundle is identical to the parallel case on the surfaces where the image formation takes place. Linear polarisation 32 is again assumed. The light bundle 31 is converted into a light bundle of which a first portion has the first polarisation direction, and a second portion has a second polarisation direction perpendicular to the first one. The polarisation may for example be altered by a retarder 35 in such a way that the polarisation is divided into two orthogonal components 36. This light bundle 36 comprising two orthogonal components impinges on a wiregrid polarizer 200. The wiregrid polarizer 200 splits the light bundle 36 into two separate bundles, one comprising the light with the first polarisation direction and once comprising the light with the second polarisation direction. The wiregrid polarizer 200 for example transmits the so-called p-polarisation 38, which is oriented orthogonal to the conductive devices. This p-light hits the light modulator panel 39 and scrolls 213 from top to center of the light modulator panel 39, before jumping back to the top.

The s-polarized light follows another light path, as illustrated in the reflection case 240. As the wiregrid polarizer 200 is oriented in such a way that the conductive elements 204 are parallel to the s-polarisation, this light is reflected, as indicated by arrow 214 in FIG. 8b. The so-called s-polarized light is only s-polarized for incidence on a first wiregrid polarizer from which it is reflected. A second wire grid polarizer 200 is provided, which is oriented in such a way, that the conductive wires 204 are rotated over 90° with respect to the conductive wires 204 of the first wire grid polarizer 200. The conductive is wires 204 are thus parallel to the plane of incidence of the light bundle, e.g. horizontal instead of vertical (as can be seen on the top view FIG. 8b). As a consequence, the light is s-polarized with respect to the initial system of reference axis, but it behaves as p-polarized light for the second wiregrid polarizer 200, and is therefore transmitted. This portion of the light beam moves downwards in direction 215 and is converted into light with the first polarisation direction, in the example illustrated p-polarisation, and is redirected to the light modulator panel 39. According to the present embodiment of the invention, this conversion and redirection may be obtained by first converting the light beam into a light bundle of which a first portion has the first polarisation direction, and a second portion has a second polarisation direction perpendicular to the first one, e.g. by having the light bundle cross a suitable polarisation conversion element 43, e.g. a birefringent material such as a 45° retarder film or a component with similar influence on the polarization of the light. After transmission through the converter 43, the polarisation state of the light has altered into state 217 which consists of a first portion of second polarisation type of light and a second portion of first polarisation type of light, e.g. ½ s-light and ½ p-light. This light bundle reaches a mirror 45, where scrolling in a direction 218, generated by the scrolling 212 from top to bottom of the original light bundle, occurs from left to right. After reflection on the flat mirror 45, the light path moves up again in direction 219, as demonstrated in insert 250 in FIG. 8(b). The polarisation 217 is not altered due to the reflection on the mirror 45. The polarisation conversion element, e.g. retarder 43, again affects the polarisation state of the light towards pure p-polarisation (in the initial reference system). This p-polarized light sees the second wiregrid polarizer 200 as s-polarized light and is therefore reflected, as illustrated by arrow 223. It subsequently moves to the right in direction 224 until it hits the light modulator panel 39. The light is scrolled from bottom to center in the direction illustrated by arrow 222 and has the same polarisation state as the light in FIG. 8a.

The examples described above both have a resulting light band scrolling in opposite directions. However, the present invention is not restricted to this. In a further embodiment of the present invention, scrolling in the same direction is provided, as illustrated in FIG. 12.

The setup shown for the transmission case 260 in FIG. 12(a) is similar to what was described in FIG. 8(a): a light bundle 31 with a scrolling direction illustrated by arrow 212 moves from left to right in direction of arrow 33. The initial linear polarisation is changed by a 45° retarder 35 in two orthogonal equally strong polarisation components, e.g. with directions p and s 36. The light with the first polarisation direction, e.g. p-light, is transmitted by the wire grid polarizer 200 and hits the light modulator panel 39. The scrolling happens from top to center of the light modulator panel 39, after which the light jumps towards the top again.

In the reflection case 270 illustrated in FIG. 12(b), we concentrate on the light with the second polarisation direction 216, e.g. s-light, which is reflected on the wiregrid polariser 200 as illustrated by arrow 214. The s-light 216 is reflected by a mirror 271, e.g. a flat mirror, towards the light modulator panel 39, as illustrated by arrow 275. As this light has another polarisation state 216 with respect to the originally transmitted light having the first polarisation state 38, e.g. p-light, an extra component 272 is added to the optical design. This optical component 272, e.g. a half-wave retarder, changes the polarisation from the second polarisation direction into the first polarisation direction, e.g. from s to p. The light hits the bottom half of the light modulator panel 39, and the scrolling, as indicated by arrow 274, goes from the center of the light modulator panel 39 to the bottom thereof i.e. in the same direction 213 as in the other half of the panel 39. This setup is useful for a light valve in which the data is written by a drive scheme similar to the one as indicated in FIG. 13, e.g. the illumination bundles scroll over the zones 21 from top to bottom in the upper half of the light modulator panel 39, and also from top to bottom in the bottom half of the light modulator panel, or vice versa.

In the above-described embodiments, linearly polarised light is assumed to be provided by the light source. The present invention, however, is not limited thereto. Circularly polarised or even elliptically polarised light can also be used. In case circularly polarised or elliptically polarised light is used, the polarisation conversion elements e.g. retarder 35, can be left out. If the light is elliptically polarized, the intensity of the light bundles in the transmitted case and in the reflected case will not be identical. Therefore, if no special measures are taken, illumination of the different zones on the light modulator panel 39 will be different. This is not recommended and correction means should be provided to correct for this brightness difference.

In embodiments of the present invention, a display system is provided with means for synchronising the dynamic modulator (and thus the scrolling of the illumination over the spatial light modulator panel 39) and the switching of the light valves of the spatial light modulator panel 39.

A controller 70 receives a video signal 71 and sends corresponding image data 72 to the light valves of the spatial light modulator panel 39. At the same time, the controller 70 controls the functioning of the dynamic modulator 120, e.g. the rotation of the prism or the rotation of the wheel, so as to synchronise the light-transmitting action of the dynamic modulator 120 with the timing of the switching of the light valves in the spatial light modulator panel 39. For example, image data representing the top part of the image in a first zone may be sent during the period in which the illumination sub-beam in that zone scrolls over the bottom part of the spatial light modulator panel 39, while at the same time image data representing the bottom part of the image in a second zone is sent, and the illumination sub-beam for that zone scrolls over the top part of the spatial light modulator panel 39. The position of the dynamic modulator, e.g. rotating wheel, may be recorded by means of an encoder such as an optical encoder 73, e.g. an optical encoder associated with an axis about which the rotating wheel rotates. The signal from the encoder 73 which is preferably an electrical signal and may be either an analog or digital signal is supplied to the controller 70. The motor 74 driving the dynamic modulator 120 may have a feedback circuit (not represented in the drawings) which allows the rotation of the motor 74 to be set to a particular value at any moment of time, e.g. a DC synchronometer. A signal provided by the controller 70 related to the switching time of the light valves in the spatial light modulator panel 39 may then be provided by the controller 70 to the motor 74 so that the dynamic modulator 120 changes, e.g. rotates, in synchronisation with the operation of the light valves. Alternatively, an open loop control system may be used, e.g. the drive motor 74 of the dynamic modulator 120 may be a stepping motor which can be driven to an exact position based on the number of steps. Then the controller 70 provides signals to the motor 74 which make it move to a specific location at a specific time so as to synchronise the dynamic modulator 120 with the operation of the light valves. Alternatively, a signal from the dynamic modulator 120, e.g. from an encoder 73, may be supplied to the controller 70, and the operation of the light valves may be synchronised to the functioning of the dynamic modulator 120, e.g. rotation of the wheel. This may be done in an open loop or closed loop manner.

It will be clear for those who are skilled in the art that systems in accordance with embodiments of the present invention can combine more single implementations of the embodiments mentioned above, so that instead of two light bundles, a higher number N>2 of these scrolling light bands (also called sub-beams) can be present in an optical system.

Figure 14:
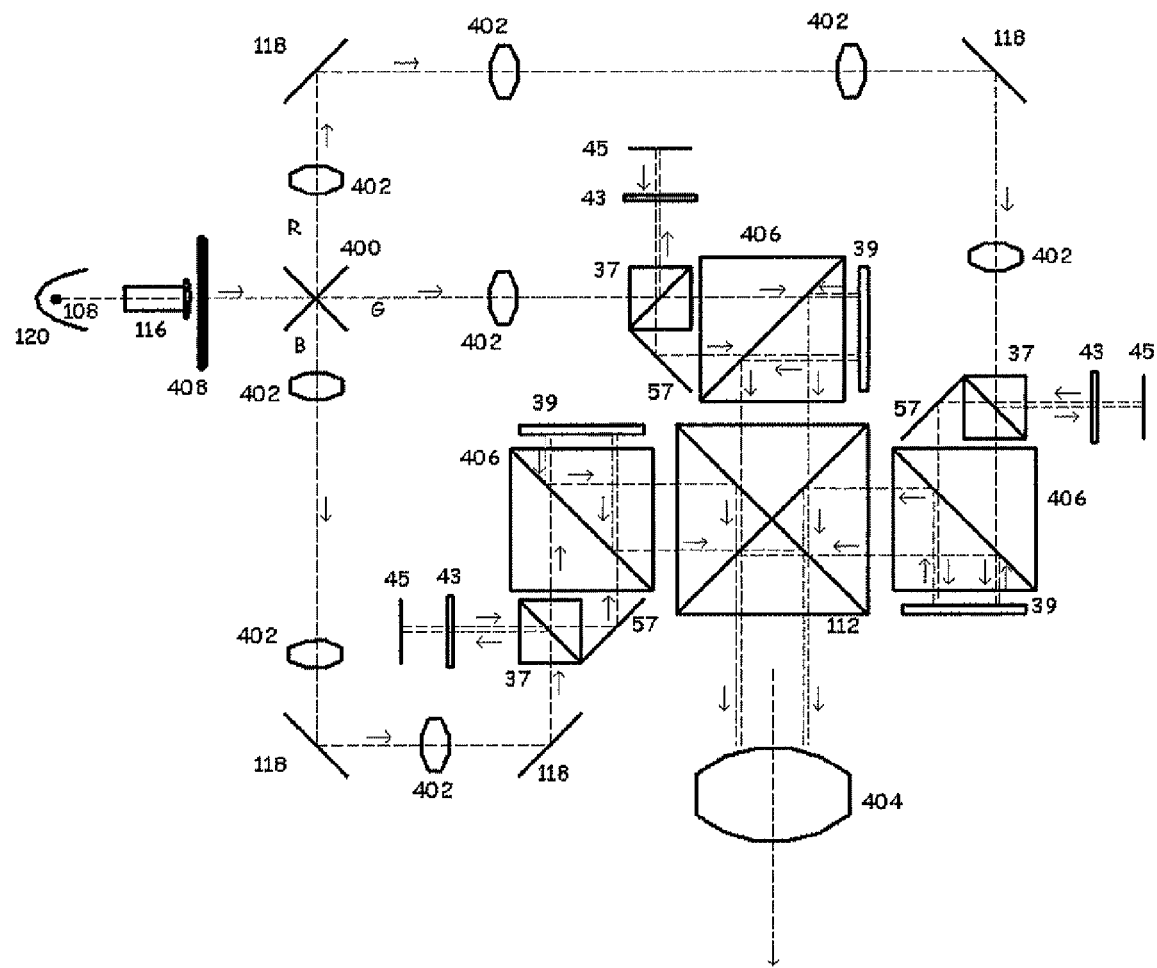
FIG. 14 is a schematic view of the main parts of a projector apparatus provided with three reflective light modulator panels, in which an optical set-up in accordance with an embodiment of the present invention has been implemented.

For the sake of clarity, a possible representation of a complete 3-panel LCOS system which makes us of the present invention is shown in FIG. 14. It should be noted that the present invention is not at all limited to the present example. The light source is a white gas discharge bulb lamp 108, positioned in a focal point of an elliptical reflector 120. An optical system 116 homogenizes the light so that a uniform rectangle appears from it. Next to this optical system, a second system 408 is present to change the polarisation state of the light and to introduce the scrolling illumination. Further to the right, the white light beam is split into three coloured light beams by e.g. a crossed set of dichroic filters 400. These three coloured light beams are each separately directed towards a splitting element, e.g. a polarizing beam splitter 37, by using sets of optical lenses 402 and mirrors 118 if necessary. This is done for splitting each of the light bundles of a distinct colour, which are each comprising two perpendicular polarisation directions, into two separate bundles, each comprising light of one of the polarisation directions The splitting element 37, e.g. polarising beam splitter, is the first component which is part of the present invention, and transmits the light of the first polarisation direction, e.g. p-polarized light, while the light of the second polarisation direction, e.g. s-polarized light, is reflected towards a polarisation conversion element 43, e.g. retarder 43, and a mirror 45. After transmission through the same polarising beam splitter 37 during the second pass the light is reflected onto a mirror 57 and the scrolled light can be directed towards the light valves of the light modulator panel 39. This light modulator panel in the case illustrated in FIG. 14 may be an LCOS display, which will alter the polarisation state for the light to be projected onto the screen (not represented in FIG. 14). In order to be able to separate the desired light, i.e. the light carrying the image information to be shown, from the light bundle reflected from the splitting element 37, an additional selective reflection element, e.g. PBS 406, is provided. The light of which the polarisation state has altered, which is light emanating from the light modulator panel 39, is redirected towards a recombination element, e.g. a so-called X-cube 112, where the three colour bundles are recombined. The light leaves the X-cube component 112 and continues its path towards additional optical lens elements 404 with the intention to display the formed image on a screen.

What I claim is:
1. A display system comprising,
   illumination means for providing a light beam,
   at least one colour channel, each colour channel being adapted for providing at least part of the light beam to a spatial light modulator panel comprising at least a first and a second zone, the zones defining stationary areas of the spatial light modulator panel,
   the display system further comprising splitting means for splitting the at least part of the light beam so that a split light beam is provided on the spatial light modulator panel, the split light beam comprising at least a first and a second sub-beam,
   driving means for driving the first and second sub-beams such that the first sub-beam scrolls only over the first zone and the second sub-beam scrolls only over the second zone.

2. A display system according to claim 1, wherein the driving means is adapted for scrolling the first sub-beam and the second sub-beam over the first and second zone, respectively, in different directions.

3. A display system according to claim 1, wherein the driving means is adapted for scrolling the first sub-beam and the second sub-beam over the first and second zone, respectively, in same directions.

4. A display system according to claim 1, wherein the light beam is a parallel beam.

5. A display system according to claim 1, wherein the light beam comprises a first portion of light with a first polarisation direction and a second portion of light with a second polarisation direction perpendicular to the first polarisation direction.

6. A display system according to claim 5, wherein the splitting means is adapted for directing the first portion of the light which has the first polarisation direction along a first path, and for directing the second portion of the beam of light which has the second polarisation direction along a second path.

7. A display system according to claim 6, wherein light on the first path forms the first sub-beam and light on the second path forms the second sub-beam.

8. A display system according claim 6, furthermore comprising optical elements in the first path for directing the first sub-beam to the first zone on the spatial light modulator panel, and optical elements in the second path for directing the second sub-beam to the second zone on the spatial light modulator panel.

9. A display system according to claim 1, wherein the driving means comprises a dynamic light modulator (34) for modulating the location of the first and second sub-beams impinging on their respective zones of the spatial light modulator panel.

10. Use of the display system of claim 1 with an LCD projector.

11. Use of the display system of claim 1 with an LCOS projector.

12. A method for producing an image, said method comprising:
providing a scrolling illumination light beam on a light modulator panel in a colour channel, the light modulator panel comprising at least two zones, the zones defining stationary areas of the spatial light modulator panel,
wherein providing the scrolling illumination light beam comprises providing a split light beam comprising at least a first and a second sub-beam,
whereby the first sub-beam is only scrolling over the first zone and the second sub-beam is only scrolling over the second zone.

13. A method according to claim 12, wherein providing the scrolling illumination sub-beams comprises providing scrolling of the sub-beams in different directions.

14. A method according to claim 12, wherein providing the scrolling illumination sub-beams comprises providing scrolling of the sub-beams in same directions.

15. A method according to claim 12, furthermore comprising synchronising scrolling of the first and second sub-beams over the first and second zones, respectively, with switching of the light valves of the light modulator panel.

16. A computer program product comprising a non-transitory computer readable medium encoded with machine-readable code for execution by a processor enabling the processor to carry out a method as in claim 15.

17. A control unit for use with a display system, the display system comprising
illumination means for providing a light beam,
at least one colour channel, each colour channel being adapted for providing at least part of the light beam to a spatial light modulator panel comprising at least a first and a second zone each comprising light valves, the zones defining stationary areas of the spatial light modulator panel,
splitting means for splitting the at least part of the light beam so that a split light beam is provided on the spatial light modulator panel, the split light beam comprising at least a first and a second sub-beam,
driving means for driving the split light beam so that the first sub-beam scrolls only over the first zone and the second sub-beam scrolls only over the second zone,
the control unit being adapted for controlling synchronisation between the driving of the scrolling of the first sub-beam over the first zone and the second sub-beam over the second zone and the switching of the light valves of the spatial light modulator panel.

* * * * *